UNITED STATES PATENT OFFICE.

ABSALOM TEMPLETON, OF ROUND ROCK, ASSIGNOR OF ONE-HALF TO DANIEL SPILLARS PAGE, OF WILLIAMSON COUNTY, TEXAS.

COLLYRIUM.

SPECIFICATION forming part of Letters Patent No. 254,724, dated March 7, 1882.

Application filed January 17, 1881. (No specimens.)

*To all whom it may concern:*

Be it known that I, ABSALOM TEMPLETON, a citizen of the United States, residing at Round Rock, in the county of Williamson and State of Texas, have discovered a new and useful Compound or Mixture for Eye-Water, of which the following is a specification.

To prepare this eye-water I mix the following ingredients in about the proportions stated, to wit: one quart of pure rain-water, one teacupful of honey, one and one-half tea-spoonful of verdigris, (chemically pure,) one teaspoonful of borax, and ten grains of morphia. These ingredients are carefully mixed by frequent stirring and shaking, after which the mixture should stand for twenty-four hours, when it is again shaken and then left to settle, after which it is filtered carefully, when it is ready for bottling and use.

I am aware that the several ingredients herein enumerated have before been used separately as topical remedies; but I am not aware that the particular combination hereinbefore described has ever been used prior to my invention or discovery thereof. Hence

I claim and desire to secure by Letters Patent of the United States—

An eye-water composed of the following ingredients, viz.: rain-water, honey, verdigris, borax, and morphia, mixed in about the proportions set forth.

ABSALOM TEMPLETON.

Witnesses:
ROBERT M. PRADRO,
BENJ. YATES.